(12) United States Patent
Hernandez

(10) Patent No.: US 7,844,714 B2
(45) Date of Patent: Nov. 30, 2010

(54) INTELLIGENT NETWORK INFORMATION SERVER (NIS) SERVER SEARCH

(75) Inventor: Paul Henry Hernandez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 12/191,403

(22) Filed: Aug. 14, 2008

(65) Prior Publication Data

US 2010/0042711 A1 Feb. 18, 2010

(51) Int. Cl.
*G06F 15/16* (2006.01)
(52) U.S. Cl. .................. 709/227; 709/202; 709/219
(58) Field of Classification Search .......... 709/227, 709/202, 219
See application file for complete search history.

(56) References Cited

U.S. PATENT DOCUMENTS

| | | | | | |
|---|---|---|---|---|---|
| 6,052,439 | A | * | 4/2000 | Gerszberg et al. | 379/88.01 |
| 7,584,301 | B1 | * | 9/2009 | Joshi | 709/244 |
| 2005/0083931 | A1 | * | 4/2005 | Blair | 370/389 |
| 2007/0118632 | A1 | | 5/2007 | Harvey | |
| 2007/0299954 | A1 | * | 12/2007 | Fatula | 709/223 |
| 2008/0014934 | A1 | * | 1/2008 | Balasubramanian et al. | 455/434 |
| 2009/0004974 | A1 | * | 1/2009 | Pyhalammi et al. | 455/67.11 |

* cited by examiner

*Primary Examiner*—David Lazaro
(74) *Attorney, Agent, or Firm*—Yee & Associates, P.C.; David A. Mims, Jr.; Rudolf O. Siegesmund

(57) ABSTRACT

An Intelligent Network Information Server Search (INSS) decreases search time required for a client to find a network information server. A cumulative history file stores a history of network information server availability, a number of communication attempts, and a communication success rate. INSS uses a ypservers file list, and orders the network information server search according to a cumulative server success rate. A system administrator may optionally define the search order with a user defined weight given to one or more of the servers. The server link and history may be stored in a random access memory to improve performance.

15 Claims, 4 Drawing Sheets

INTELLIGENT NETWORK INFORMATION SERVER (NIS) SERVER SEARCH

FIELD THE OF INVENTION

The invention relates generally to network information server availability, and specifically to assigning preferences or "weights" to network information servers in order to decrease search time for available and effective network information servers.

BACKGROUND OF THE INVENTION

A known computer file (/var/yp/binding/'domainname'/ypservers) contains a list of internet protocol (IP) addresses for network information servers ("NIS") on each line of the file. NIS clients perform a sequential search, line by line, from top to bottom, attempting to access each server until successful communication is established. The client is then "bound" to the server until communication is lost.

This current method is inefficient for several reasons. Each server is positioned so that communication is attempted despite the server's availability or its abilities in terms of workload. This method of NIS selection is detrimental to system and network performance since NIS servers are used as a repository for such files as "/etc/hosts," "/etc/services/," "/etc/passwd" and "etc/group." Furthermore, once communication with the server is lost, the search for another compatible server begins again sequentially from top to bottom of the list without recollection of the last successful server. This top to bottom search for a successful server causes extreme delays in establishing server communication, especially when the only available server may be at the bottom of the moderate to long server list.

While there have been attempts to make the NIS server search more productive through environmental variables, these variables only partially address the NIS server problem, and are known and used by a only minority of NIS users. These environmental variables are: YPTIMEOUT, YPBIND_SKIP, and YPBIND_MAXWAIT. YPTIMEOUT=n represents the number of seconds (n) allowed for a reply before a timeout-move occurs on the NIS in the ypservers file. YPBIND_SKIP, causes the client to skip the last server it was bound to in the ypservers file, but the search for a server in the ypservers file remains sequential from top to bottom. YPBIND_SKIP is not always effective unless the last bound server is the first server in the list, or if there is only one listed server. Otherwise, successful communication can occur with a different server listed above the server that is to be skipped. In such cases, the client may never reach the skipped server, causing the logic associated with YPBIND_SKIP to be wasted and inefficient. YPPBIND_MAXWAIT=n represents the number of seconds (n) the NIS client will wait before abandoning the search. Once the timeout is exceeded, the client will behave as if no NIS is available for binding. Therefore, a need exists for a way to decrease a client's search time for finding an NIS server and to eliminate a need for YPBIND_SKIP.

SUMMARY OF THE INVENTION

An Intelligent Network Information Server Search ("INSS") method and system decreases search time required for a client to find an NIS server. INSS implements a history of NIS availability, a number of attempts to communicate with each server, and a communication success rate. INSS records the last server used in the history, and moves to the next server in the list before returning to the top of the list in a round-robin fashion. INSS uses the ypservers file list and adds an additional user defined "weight" field. A system administrator may optionally define the search order with an account history. The additional weight field provides a valuable enhancement for customers who implement "workload efficiency" or who examine how NIS clients bind to servers. INSS is otherwise transparent to the system administrator and requires no additional training. INSS eliminates a need for YPBIND_SKIP while incorporating other environmental variables. INSS also provides quicker access by using YPBIND with a server link list in memory rather than with a file on a hard disk.

BRIEF DESCRIPTION OF THE DRAWINGS

The novel features believed characteristic of the invention are set forth in the appended claims. The invention itself, as well as a preferred mode of use, further objectives, and advantages thereof, will be understood best by reference to the following detailed description of an illustrative embodiment when read in conjunction with the accompanying drawings, wherein:

DETAILED DESCRIPTION

The principles of the present disclosure are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present disclosure may be distributed among a plurality of computers and computer programs. The invention is described best, though, as a single computer program that configures and enables one or more general-purpose computers to implement the novel aspects of the invention. For illustrative purposes, the inventive computer program will be referred to as the Intelligent Network Information Server Search (INSS).

Figure 1A:
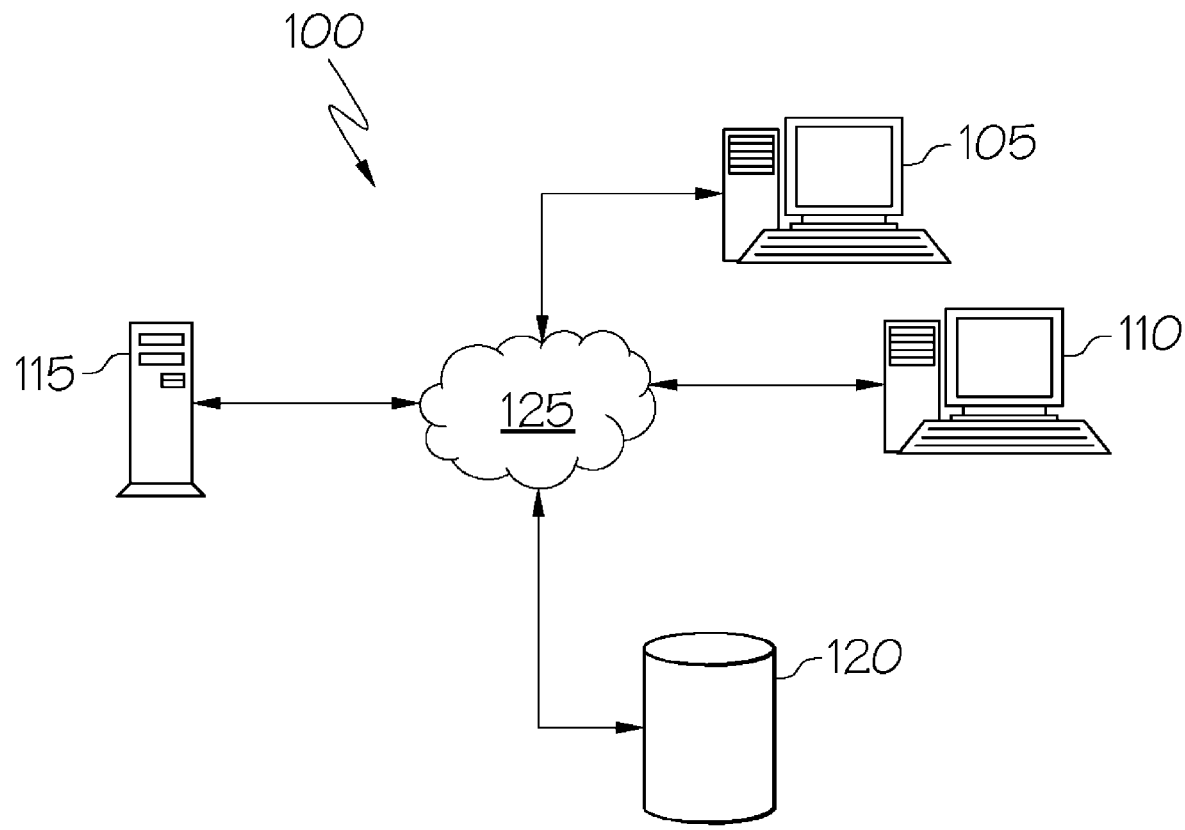
FIG. 1A illustrates a computer network.

Additionally, the INSS is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
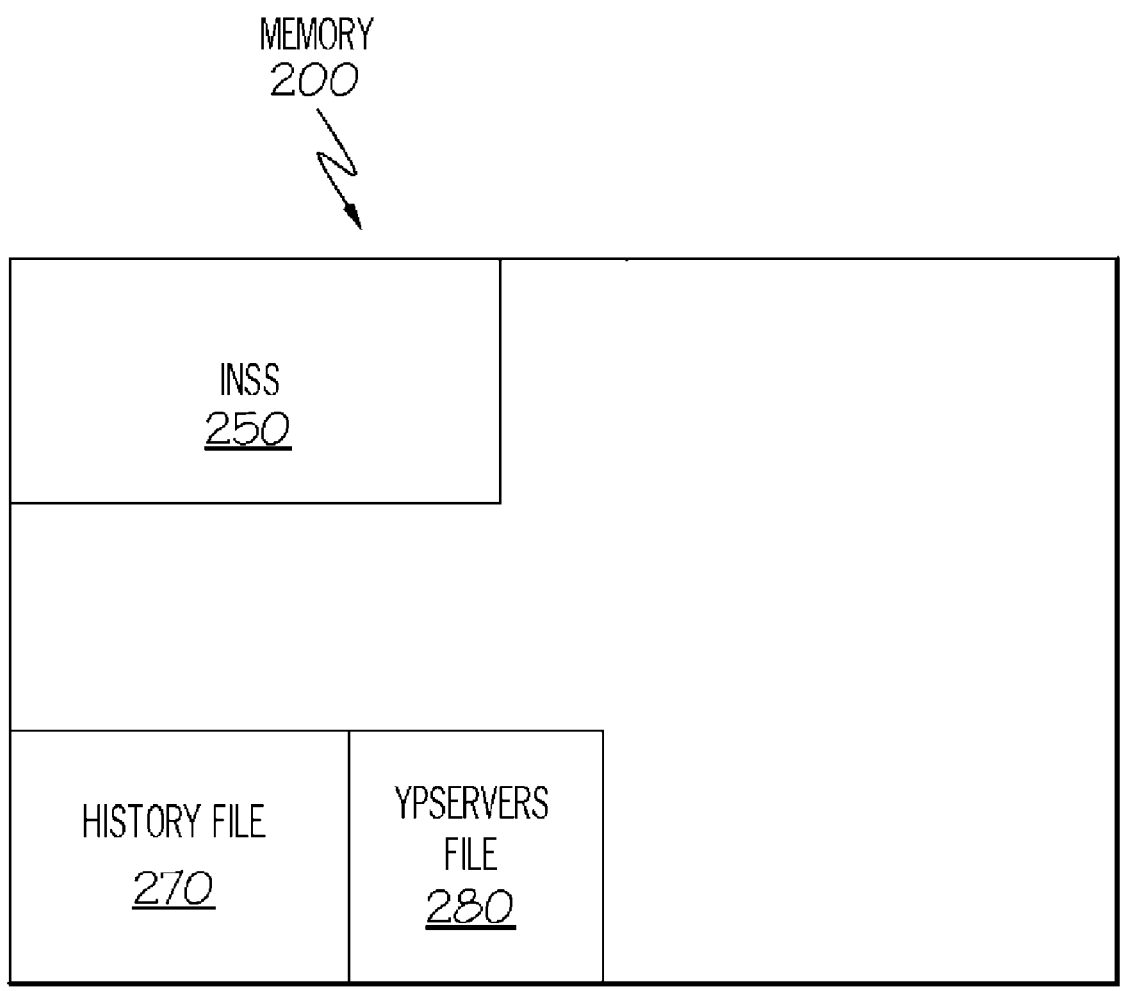
FIG. 2 illustrates a computer memory.

INSS 250, typically stored in a memory, is represented schematically as memory 200 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, INSS 250 may reside in more than one memory distributed across different computers, servers, logical partitions, or other hardware devices. The elements depicted in memory 200 may be located in or distributed across separate memories in any combination, and INSS 250 may be adapted to identify, locate, and access any of the elements and coordinate actions, if any, by the distributed elements. Thus, FIG. 2 is included merely as a descriptive expedient and does not necessarily reflect any particular physical embodiment of memory 200. As depicted in FIG. 2, though, memory 200 may include additional data and programs. Of particular import to INSS 250, memory 200 includes history file 270 and ypservers file 280.

The INSS 250 method and system decreases the search time required to find an NIS server for clients. The INSS 250 implements a history of NIS availability, number of attempts to communicate with each server, and a communication success rate. INSS records the last server used in the history, and moves to the next server in the list before returning to the top of the list in a round-robin fashion.

INSS 250 uses the conventional file format of ypservers, and adds a INSS weight field. The weight follows the IP address of each server in the ypservers file. The weight field has two values: 1 or 2, where 1 has higher priority than 2. The default condition is NULL (no value), resulting in no priority for a given NIS. When several IP address entries have the same weight value, the history file determines the order of the servers at those IP addresses based on the success rate stored in the history file. If the success rate is a tie then the server order is determined by the order of selection or evaluation.

For example:

The file /var/yp/'bindingrdomainname'/ypservers contains the following IP addresses with corresponding weight values:
9.9.9.9
8.8.8.8
7.7.7.7,2
6.6.6.6,1
5.5.5.5,2

The server with IP address of 6.6.6.6 is tried first due to the added weight value of 1. Since there is more than one server with weight value of 2, the history of servers, 7.7.7.7 and 5.5.5.5 is evaluated in the listed order to decide the search sequence for the 2nd and 3rd server. For the remaining servers with no priority—9.9.9.9, and 8.8.8.8 in this example—the success rate, if any, of each server in the history file then determines the order of the server after the priority servers are evaluated. If a there is a tie for the success rate, the servers are selected or evaluated in the order they were listed.

When the command /lib/netsvc/yp/ypbind is invoked, the link list is populated and kept in memory. The order of the link list is based on the /var/yp/'bindingrdomainname'/ypservers file, that contains the weight value and the history file, /var/yp/'bindingrdomainname'/history, that contains the success rate. The ypservers and history files are only read once during ypbind startup. After startup, ypbind uses the link list in memory to bind to the appropriate server. To incorporate any modifications with the ypservers file, the ypbind command must be stopped and restarted.

The entries in the link list each have the following structure:

```
struct {
    char ipadd[8]    // ip address in hex
    int attempts     // number of attempts
    int success      // number of successful attempts
}
```

The link list is traversed using the pointers headptr and nextptr. The headptr points to the first entry in the link list. The nextptr is initially set to NULL until the next entry in the link list needs to be evaluated and the nextptr updated. When the headptr equals the nextptr and the YPBIND_MAXWAIT was already set and honored, then the link list is traversed; otherwise, default behavior occurs which initiates "indefinite subnet broadcast to bind."

After each link entry is tried or when ypbind stops, the history file is overwritten by the link list. The history is comprised of the IP address, the number of attempts, and number of successes.

Figure 3:
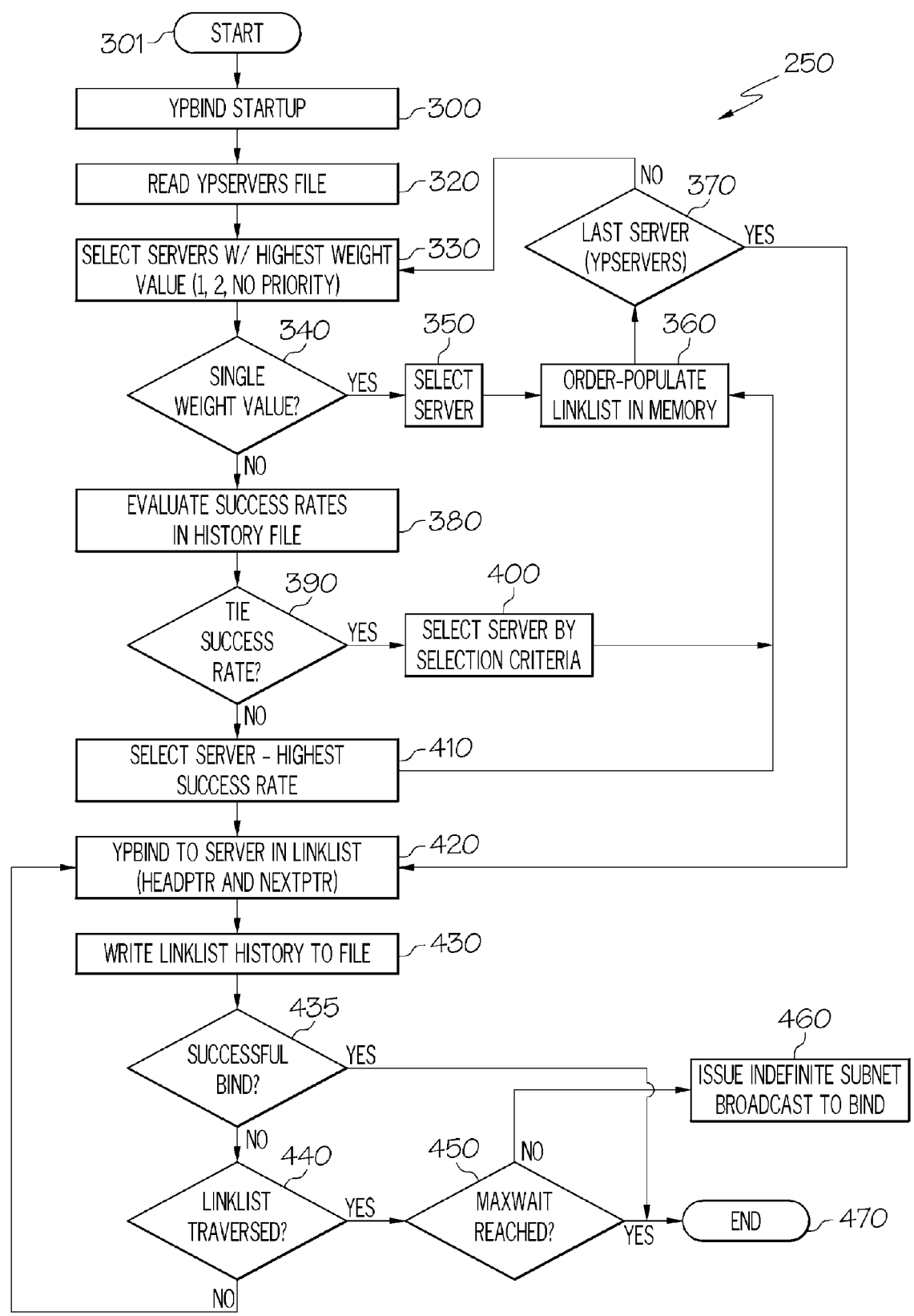
FIG. 3 is a flow chart of a first embodiment of the INSS system.

FIG. 3 is a schematic flow diagram of one embodiment of INSS 250. INSS 250 starts (301), ypbind starts (300), and the ypservers file is read (320). INSS 250 selects the servers with the highest weight value of 1 (330). When there is only one server with a weight value of 1 (340) then that server is selected (350) and populated to the link list in memory (360). If that server is not the last server in ypservers file (370), then the next server in the ypservers file is evaluated (330). When there is more than one server in the ypservers file with the same weight value of 1 (340), then the success rate of each server in the history file is evaluated (380). When there is no tie for the success rate (390), the server with the highest success rate is selected (410); otherwise, the server is selected based upon a selection criteria for the order of selection (400). INSS 250 orders and populates the servers in the link list in memory (360). When the server is not the last server in the ypservers file (370), INSS 250 evaluates the next server in the ypservers file (330).

On the next pass, INSS 250 selects the servers with the weight value of 2 (330). When there is only one server with a weight value of 2 (340) INSS 250 selects that server (350) and orders and populates that server in the link list in memory (360). When the server with the weight value of 2 is not the last server in ypservers file (370), INSS 250 evaluates the next server in ypservers file (330). When there is more than one server in the ypservers file with the same weight value of 2 (340), INSS 250 evaluates the success rate of each server in the history file (380). When there is no tie (390), INSS 250 selects the server with the highest success rate (410); otherwise, when there is a tie, the server is selected based upon a selection criteria for the order of selection (400). INSS 250 orders and populates the servers in the link list in memory (360). When the server is not the last server in ypservers file (370), the next server in the ypservers file is evaluated (330).

On the next pass, INSS 250 selects the servers with the weight value of no priority (330). When there is only one server with a weight value of no priority (340) INSS 250 selects that server (350) and orders and populates that server in the link list in memory (360). When the server is not the last server in the ypservers file (370), the next server in the ypservers file is evaluated (330). When there is more than one server in the ypservers file with the same weight value of no priority (340), then INSS 250 evaluates the success rate of each server in the history file (380). When there is no tie (390), the server with the highest success rate is selected (410); otherwise, if there is a tie, the server is selected based upon a selection criteria for the order of selection (400). INSS 250 orders and populates the servers in the link list in memory (360). When the server is not the last server in the ypservers file (370), the next server in the ypservers file is evaluated (330).

When all the servers in the ypservers file have been evaluated (370), ypbind attempts to bind to the servers in the link list in memory based upon the headptr and nextptr values (420). Once ypbind concludes, the entire link list is overwritten to the linklist history file (430). If ypbind is successful (435) then INSS 250 ends (470). When ypbind is not successful (435) INSS 250 checks to determine if the link list has been traversed (440). When the link list has not been traversed, INSS 250 repeats based upon nextptr (420) until the link list is traversed (440). When the link list has been traversed (440), INSS 250 determines whether $MAX_{13}$ WAIT may be reached (450). When $MAX_{13}$ WAIT has been reached, INSS 250 ends (470). When $MAX_{13}$ WAIT is not reached, an indefinite subnet broadcast is issued (460) and INSS 250 goes to step 330 and cycles until $MAX_{13}$ WAIT is reached.

Figure 4:
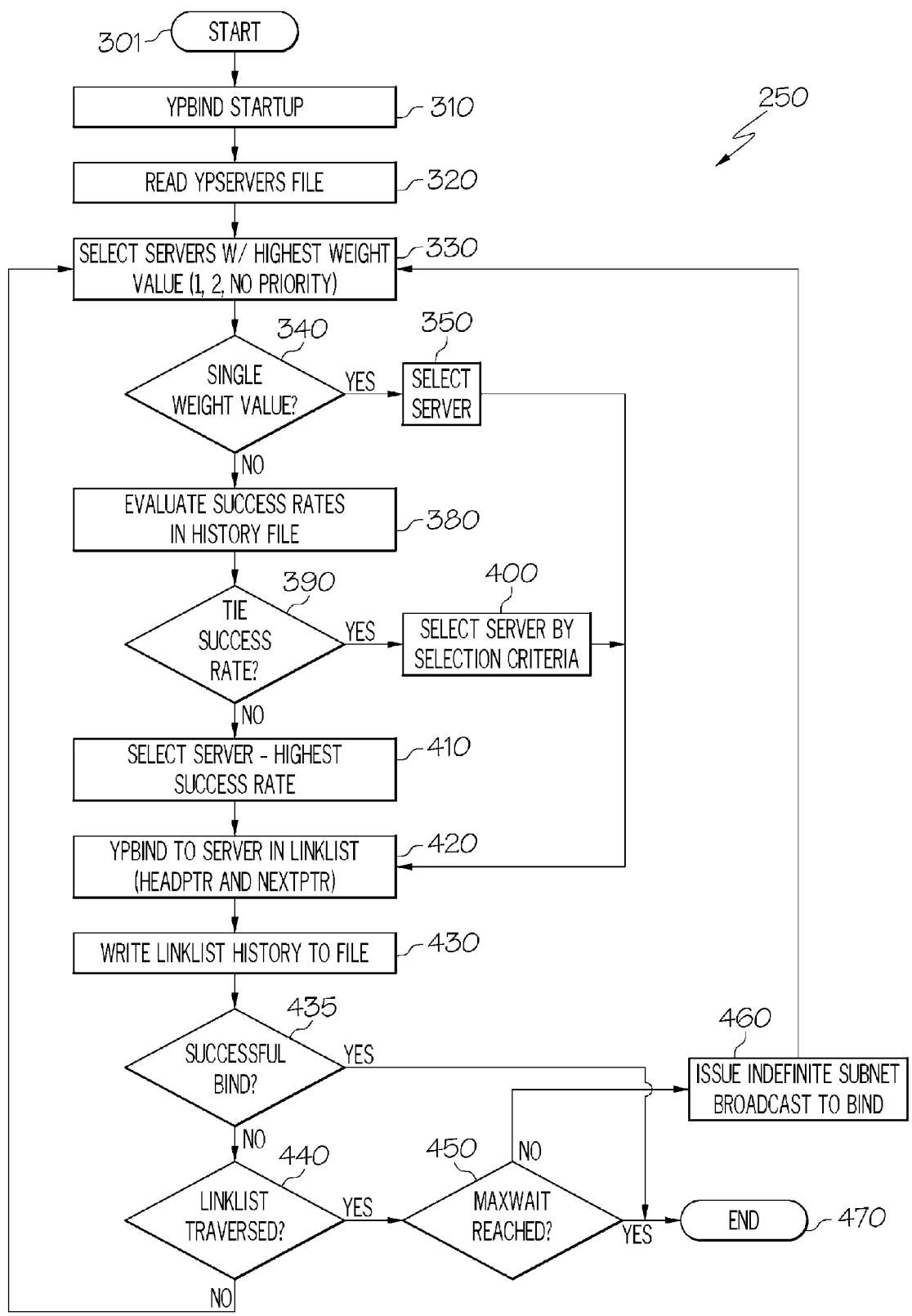
FIG. 4 is a flow chart of a second embodiment of the INSS system.

FIG. 4 is a schematic diagram of an alternate configuration of INSS 250 without steps 360 and 370 as depicted in FIG. 3. INSS 250 starts (301), ypbind starts (310), and the ypservers file is read (320).

To begin, INSS 250 selects the servers with the highest weight value of 1 (330). When there is only one server with a weight value of 1 (340), INSS 250 select that server (350), ypbind attempts to bind the servers in the link list in memory based upon the headptr and nextptr values (420). Once ypbind concludes, the entire link list is overwritten to the linklist history file (430). When ypbind is successful (435), INSS 250 ends (470). When ypbind is not successful (435) INSS 250 checks to determine if the link list has been traversed (440). When the link list has not been traversed, INSS 250 repeats based upon nextptr (420) until the link list is traversed (440). When the link list has been traversed (440), INSS 250 determines whether $MAX_{13}$ WAIT is reached (450). When $MAX_{13}$ WAIT is reached, INSS 250 ends (470). When $MAX_{13}$ WAIT is not reached, an indefinite subnet broadcast is issued (460) and INSS 250 goes to step 330 anc cycles until $MAX_{13}$ WAIT is reached.

When there are multiple servers with a weight value of 1 (340), INSS 250 evaluates the success rate of each server in the history file (380). When there is no tie for the success rate (390), the server with the highest success rate is selected (410), and (420). Otherwise, when there is a tie, INSS 250 selects the server based upon the order of selection (400), ypbind attempts to bind the servers in the link list in memory based upon the headptr and nextptr values (420). Once ypbind concludes, the entire link list is overwritten to the linklist history file (430). When ypbind is successful (435) INSS 250 ends (470). When ypbind is not successful (435) INSS 250 checks to determine if the link list has been traversed (440). If not, INSS 250 repeats based upon nextptr (420) until the link list is traversed (440). When the link list has been traversed (440), INSS 250 determines whether $MAX_{13}$ WAIT is reached (450). When $MAX_{13}$ WAIT is reached, INSS 250 ends (470). When $MAX_{13}$ WAIT is not reached, an indefinite subnet broadcast is issued (460) and INSS 250 goes to step 330 and cycles until $MAX_{13}$ WAIT is reached.

On the next pass, INSS 250 selects the servers with the weight value of 2 (330). When there is only one server with a weight value of 2 (340) INSS 250 selects that server (350) and ypbind attempts to bind the servers in the link list in memory based upon the headptr and nextptr values (420). Once ypbind concludes, the entire link list is overwritten to the history file (430). When ypbind is successful (435) INSS 250 ends (470). When ypbind is not successful (435) INSS 250 checks to determine if the link list has been traversed (440). If the link list has not been traversed, INSS 250 goes to step 420 and cycles based upon nextptr (420) until the link list is traversed (440). When the link list has been traversed (440), INSS 250 determines if $MAX_{13}$ WAIT is reached (450). When $MAX_{13}$ WAIT is reached, INSS 250 ends (470). When $MAX_{13}$ WAIT is not reached, an indefinite subnet broadcast is issued (460) and INSS 250 goes to step 330 and cycles until $MAX_{13}$ WAIT is reached.

When there are multiple servers with a weight value of 2 (340) INSS 250 evaluates the success rate of each server in the history file (380). When there is no tie (390), the server with the highest success rate is selected (410), and ypbind attempts to bind the servers in the link list in memory based upon the headptr and nextptr values (420). Otherwise, when there is a tie, INSS 250 selects the server based upon a selection criteria (400), and goes to step 420. Once ypbind concludes, the entire link list is overwritten to the history file (430). When ypbind is successful (435) INSS 250 ends (470). When ypbind is not successful (435) INSS 250 checks to determine if the link list has been traversed (440). If the link list has not been traversed, INSS 250 goes to step 420 and cycles until the link list is traversed (440). When the link list has been traversed (440), INSS 250 determines whether $MAX_{13}$ WAIT is reached (450). When $MAX_{13}$ WAIT is reached INSS 250 ends (470). When $MAX_{13}$ WAIT is not reached, an indefinite subnet broadcast is issued (460) and INSS 250 goes to step 330 and cycles until $MAX_{13}$ WAIT is reached.

On the next pass, INSS 250 selects the servers with the weight value of no priority (330). When there is only one server with a weight value of no priority (340), INSS 250 selects that server (350) and goes to step (420) where ypbind attempts to bind the servers in the link list in memory based upon the headptr and nextptr values. Once ypbind concludes, the entire link list is overwritten to the history file (430). When ypbind is successful (435) INSS 250 ends (470). When ypbind is not successful (435), INSS 250 checks to determine if the link list has been traversed (440). If the link list has not been traversed, INSS 250 goes to step 420 and cycles until the link list is traversed (440). When the link list has been traversed (440), INSS 250 determines whether $MAX_{13}$ WAIT is reached (450). When $MAX_{13}$ WAIT is reached, INSS 250 ends (470). When $MAX_{13}$ WAIT is not reached, an indefinite subnet broadcast is issued (460) and INSS 250 goes to step 330 and cycles until $MAX_{13}$ WAIT is reached.

When there are multiple servers with a weight value of no priority (340), the success rate of each server in the history file is evaluated (380). When there is no tie (390), the server with the highest success rate is selected (410) and INSS goes to step 420. Otherwise when there is a tie, the server is selected based upon a selection criteria for the order of selection (400) and INSS 250 goes to step 420 where ypbind attempts to bind the servers in the link list in memory based upon the headptr and nextptr values. Once ypbind concludes, the entire link list is overwritten to the history file (430). When ypbind is successful (435) INSS 250 ends (470). When ypbind is not successful (435) INSS 250 checks to determine if the link list has been traversed (440). When the link list has not been traversed, INSS 250 goes to step 420 and cycles until the link list is traversed. When the link list has been traversed (440), INSS 250 determines whether $MAX_{13}$ WAIT is reached (450). When $MAX_{13}$ WAIT is reached, INSS 250 ends (470). When $MAX_{13}$ WAIT is not reached, an indefinite subnet broadcast is issued (460) and INSS 250 goes to step 330 and cycles until $MAX_{13}$ WAIT is reached.

INSS implements a history of NIS availability, a number of attempts to communicate with each server, and a communication success rate. INSS records the last server used in the history, and moves to the next server in the list before returning to the top of the list in a round-robin fashion. INSS uses the ypservers file list and adds an additional user defined "weight" field. A system administrator may optionally define the search order with an account history. The additional weight field provides a valuable enhancement for customers who implement "workload efficiency" or who examine how NIS clients bind to servers. INSS is otherwise transparent to the system administrator and requires no additional training. INSS eliminates a need for YPBIND_SKIP while incorporating other environmental variables. INSS also provides quicker access by using YPBIND with a server link list in memory rather than with a file on a hard disk. INSS may be take the form of a computer implemented method, a program product comprising instructions on a computer readable medium to cause a computer to perform the INSS method, or an apparatus comprising a computer connected to a memory, the memory containing instructions to cause to the computer to perform the INSS method.

It will be understood from the foregoing that various modifications and change may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed is:

1. A computer implemented process for decreasing a search time required for a client to find and bind to a network information server, comprising:
using a computer having a memory, performing the following steps:
storing a plurality of network information server internet protocol addresses in an address file and storing a cumulative success rate for each network information server internet protocol address in a history file;
assigning a user defined weight value to one or more of the network information server protocol addresses and storing the user defined weight value in the address file;
receiving a binding request from a client;
sequentially searching the address file in an order of the user defined weight value and selecting an available network information server having a greatest weight value;
continue sequentially searching the address file until the binding request results in a successful communication between the client and the available network information server, or until the available network information server having the greatest weight value is not found;
when the available network information server having the greatest weight is found, adding the internet protocol address of the corresponding available network information server to the cumulative success rate, updating the history file, and terminating the search;
when the available network information server having the greatest weight is not found, evaluating the cumulative success rate, sorting the plurality of network information server internet protocol addresses in an order of the cumulative success rate and storing a sorted network information server internet protocol address list in the history file;
sequentially searching the history file for an available network information server and selecting the available network information server having a highest cumulative success rate;
continuing a search until the binding request results in a successful communication between a client and the available network information server; and
adding an internet protocol address of a corresponding available network information server to the cumulative success rate, updating the history file, and terminating the search;
whereby the length of time required for the client to find and bind to a network information server is reduced.

2. The computer implemented method of claim 1, further comprising: storing the address file and the history file in a random access memory in the computer.

3. The computer implemented method of claim 2, wherein the plurality of network information server internet protocol addresses are read from a ypservers file; and the history file includes a linklist file.

4. The computer implemented method of claim 1, further comprising: storing the address file and the history file in a random access memory in the computer.

5. The computer implemented method of claim 4, wherein the plurality of network information server internet protocol addresses are read from a ypservers file; and the history file includes a linklist file.

6. A computer program product for causing the computer to find and bind to a network information server, comprising:
a non-transitory computer readable storage medium;
a program stored in the computer readable storage medium;
wherein the computer readable storage medium, so configured by the program, causes the computer to perform the steps comprising:
storing a plurality of network information server internet protocol addresses in an address file and storing a cumulative success rate for each network information server internet protocol address in a history file;
assigning a user defined weight value to one or more of the network information server internet protocol addresses and storing the user defined weight value in the address file;
receiving a binding request from a client;
sequentially searching the address file in an order of the user defined weight value and selecting an available network information server having a greatest weight value;
continue sequentially searching the address file until the binding request results in a successful communication between the client and the available network information server, or until an available network information server having the greatest weight value is not found;
when the available network information server having the greatest weight is found, adding the internet protocol address of the corresponding available network information server to the cumulative success rate, updating the history file, and terminating the search;

when an available network information server having the greatest weight is not found, evaluating the cumulative success rate, sorting the plurality of network information server internet protocol address in an order of the cumulative success rate and storing a sorted network information server internet protocol address list in the history file;

sequentially searching the history file for an available network information server and selecting the available network information server having a highest cumulative success rate;

continuing a search until the binding request results in a successful communication between the client and the available network information server, and adding the internet protocol address of the corresponding available network information server to the cumulative success rate, updating the history file, and terminating the search;

whereby the length of time required for the client to find and bind to a network information server is reduced.

7. The computer implemented method of claim 6, further comprising: storing the address file and the history file in a random access memory in the computer.

8. The computer implemented method of claim 7, wherein the plurality of network information server internet protocol addresses are read from a ypservers file; and the history file includes a linklist file.

9. The computer implemented method of claim 6, further comprising: storing the address file and the history file in a random access memory in the computer.

10. The computer implemented method of claim 9, wherein the plurality of network information server internet protocol addresses are read from a ypservers file; and the history file includes a linklist file.

11. A programmable apparatus for binding a client to a network information server, comprising:

a programmable hardware connected to a memory;

a program stored in the memory;

wherein the program directs the programmable hardware to perform the steps comprising:

storing a plurality of network information server internet protocol addresses in an address file and storing a cumulative success rate for each network information server internet protocol address in a history file;

assigning a user defined weight value to one or more of the network information server internet protocol addresses, and storing the user defined weight value in the address file;

receiving a binding request from a client;

sequentially searching the address file in an order of the user defined weight value and selecting an available network information server having a greatest weight value;

continue sequentially searching the address file until the binding request results in a successful communication between the client and the available network information server, or until the available network information server having the greatest weight value is not found;

when the available network information server having the greatest weight is found, adding the internet protocol address of the corresponding available network information server to the cumulative success rate, updating the history file, and terminating the search;

when the available network information server having the greatest weight is not found, evaluating the cumulative success rate, sorting the plurality of network information server internet protocol address in an order of the cumulative success rate and storing the sorted network information server internet protocol addresses in the history file;

sequentially searching the history file for an available network information server and selecting the available network information server having a highest cumulative success rate;

continuing a search until the binding request results in a successful communication between the client and an available network information server; and adding the internet protocol address of the corresponding available network information server to the cumulative success rate, updating the history file, and terminating the search;

whereby the length of time required for the client to find and bind to a network information server is reduced.

12. The computer implemented method of claim 11, further comprising: storing the address file and the history file in a random access memory in the computer.

13. The computer implemented method of claim 12, wherein the plurality of network information server internet protocol addresses are read from a ypservers file; and the history file includes a linklist file.

14. The computer implemented method of claim 11, further comprising: storing the address file and the history file in a random access memory in the computer.

15. The computer implemented method of claim 14, wherein the plurality of network information server internet protocol addresses are read from a ypservers file; and the history file includes a linklist file.

* * * * *